United States Patent
Kasemura et al.

(12)

(10) Patent No.: US 6,756,331 B2
(45) Date of Patent: Jun. 29, 2004

(54) LACTIC-ACID BASE RESIN COMPOSITION AND MOLDED ARTICLES MADE THEREFOR

(75) Inventors: Tomoyuki Kasemura, Gifu (JP); Shinya Takahashi, Gifu (JP); Naoto Kuriyama, Gifu (JP); Shoji Obuchi, Chiba (JP); Takayuki Watanabe, Chiba (JP); Yasuhiro Kitahara, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 107 days.

(21) Appl. No.: 10/070,733

(22) PCT Filed: Jul. 16, 2001

(86) PCT No.: PCT/JP01/06125

§ 371 (c)(1),
(2), (4) Date: Mar. 12, 2002

(87) PCT Pub. No.: WO02/06400

PCT Pub. Date: Jan. 24, 2002

(65) Prior Publication Data

US 2002/0198332 A1 Dec. 26, 2002

(30) Foreign Application Priority Data

Jul. 17, 2000 (JP) ....................................... 2000-215727

(51) Int. Cl.[7] ......................... B32B 27/36; B29O 22/00; C08L 77/00

(52) U.S. Cl. ....................... 442/327; 525/450; 525/424; 525/434; 525/437; 442/414; 428/364; 428/397

(58) Field of Search .................. 428/480, 35.5, 428/35.7; 442/327, 414, 364, 397; 525/450, 424, 434, 437

(56) References Cited

U.S. PATENT DOCUMENTS

2002/0094444 A1 * 7/2002 Nakata et al. ............... 428/480

FOREIGN PATENT DOCUMENTS

JP          10-262474 A     10/1998

* cited by examiner

*Primary Examiner*—Cheryl A. Juska
*Assistant Examiner*—Lynda Salvatore
(74) *Attorney, Agent, or Firm*—Burns, Doane, Swecker & Mathis, L.L.P.

(57) ABSTRACT

A lactic acid-based resin composition containing a mixture of (A) a mixture of (a1) polylactic acid and (a2) an aliphatic polyester, and (B) an aliphatic block co-polyester having a polylactic acid segment and an aliphatic polyester segment, wherein the aliphatic block co-polyester (B): (1) contains a lactic acid component in an amount of from 20 to 80 wt % in terms of monomer, (2) has a weight average molecular weight of 1,000 or more and less than 60,000, and (3) has a weight average molecular weight of the polylactic acid segment of from 500 to 55,000 and a weight average molecular weight of the aliphatic polyester segment of from 500 to 55,000. A molded article formed from the composition can be a film, a sheet, a filament.

12 Claims, No Drawings

LACTIC-ACID BASE RESIN COMPOSITION AND MOLDED ARTICLES MADE THEREFOR

TECHNICAL FIELD

The present invention relates to a lactic acid-based resin composition and a molded article thereof. More specifically, it relates to a lactic acid-based resin composition that is excellent in moldability, flexibility and safety and is easily decomposed in the natural environment after use, and a molded article thereof.

BACKGROUND ART

In general, as resins that are excellent in flexibility, heat resistance and water resistance, such resins are exemplified, as polyethylene, polypropylene, plasticized polyvinyl chloride, polyethylene terephthalate and the like, and are used as a disposal bag, a packaging bag and the like. However, these resins increase the amount of waste upon discarding after use, and because they are substantially not decomposed under the natural environment, they semipermanently remain underground even when they are discarded underground. There also arise problems in that discarded plastics impair scenery and destroy the life environments of marine organisms.

In order to cope therewith, as a polymer having biodegradability, which is a thermoplastic resin, an aliphatic polyester derived from a polyhydroxycarboxylic acid, such as polylactic acid and the like, with an aliphatic polyhydric alcohol and an aliphatic polyhydric carboxylic acid, and the like are being developed.

These polymers are completely decomposed in the body of animals within several months to one year, or when they are placed in earth or ocean water, they begin to be decomposed within several weeks under a wet environment and disappear within about one year to several years. Furthermore, they have such characteristics that the decomposed products are lactic acid, carbon dioxide and water, which are harmless to human bodies.

In particular, polylactic acid is expected to have an expanded utility field owing to the facts that L-lactic acid as the raw material can be mass-produced at low cost by the fermentation process, and it exhibits a large decomposition rate in barnyard manure, and has excellent characteristics, such as the resistance to fungus, resistance to odorization and coloring of foods, and the like.

However, polylactic acid has high rigidity and thus cannot be said that it is a resin suitable for such purposes that require flexibility, such as a film, a packaging material and the like.

In general, it has been known as a method for softening a resin that a soft polymer is blended, but when a soft general-purpose resin, such as resins including polyethylene, polypropylene, polyvinyl chloride or the like, is mixed with polylactic acid, it is impossible to develop a lactic acid-based resin composition having biodegradability and flexibility, which is the object of the invention described later. Therefore, what can impart flexibility to polylactic acid through polymer blend is limited to soft biodegradable resins. As these resins, polybutylene succinate, polyethylene succinate, polyhydroxybutyric acid, polyhydroxyvaleric acid, polycaprolactone, a copolymer and a mixture thereof, and the like are exemplified, and they have been disclosed in Japanese Patent Laid-Open No. 245866/1996 and Japanese Patent Laid-Open No. 111107/1997.

However, these soft resins have poor compatibility with polylactic acid, and there are several problems upon practical use for producing a film, a filament and the like when it is simply melted and mixed. For example, upon molding a film and a filament, because they do not sufficiently attain uniform mixing even when they are subjected to heat melting and kneading in an extruder viscosity unevenness, unevenness in thickness of a film and unevenness in diameter of a thread occur, and furthermore, breakage of a film and breakage of a thread occur, whereby stable molding is difficult.

Moreover, even though a film or a thread can be obtained, upon subsequently subjecting orientation by stretching for increasing properties, such as heat resistance, strength and the like, it is liable to be broken upon stretching, whereby stable stretching cannot be carried out, or stretching cannot be carried out with sufficient magnification. As a result, the heat resistance and the strength cannot be sufficiently improved, and such a problem is caused in that a film and a thread that can be practically used cannot be obtained.

Japanese Patent Laid-Open No. 262474/1998 discloses an agricultural sheet formed with a mixture of (A) crystalline polylactic acid having a melting point of 150° C. or more, (B) an aliphatic polyester having a melting point of 140° C. or less formed with a linear diol and an aliphatic dicarboxylic acid as main components, and (C) a block copolymer of the polylactic acid (A) and the aliphatic polyester (B), and fibers. It is also disclosed that the mixture is improved in flowability and moldability in comparison to a simple mixture of the polylactic acid and the aliphatic polyester of a linear diol and an aliphatic dicarboxylic acid. However, there is no specific disclosure of examples, and in particular, it is expected from the description of other examples that the block copolymer (C) has a molecular weight of several hundreds of thousands. However, in the case where a block polymer having such a large molecular weight is used, the effects of improvement in flowability and moldability are not sufficiently exerted as is clear from the comparative examples described later.

As has been described, it is the current situation that it is substantially difficult that a molded article, such as a film, a filament and the like, imparted with flexibility is stably obtained with good productivity only by blending a soft biodegradable resin with polylactic acid, and furthermore, it is substantially impossible with the conventional techniques to improve properties, such as heat resistance, strength and the like, by orientation and crystallization by stretching.

In the invention, 1) a technique for effectively dispersing a soft biodegradable resin with polylactic acid, 2) development of a flexible lactic acid-based resin composition, and 3) a molded article, such as a film, a filament and the like, obtained from a flexible lactic acid-based resin composition, as well as 4) development of a production process of a molded article that is highly and effectively imparted with practical properties, such as strength, heat resistance, flexibility and the like, from polylactic acid are designated as objects.

DISCLOSURE OF THE INVENTION

In order to attain the objects, the inventors have designed and explored a compound for improving the compatibility between polylactic acid and a soft biodegradable resin, and as a result, such a compound has been found that has a sufficient compatibility effect with a small amount to satisfy the objects, whereby the invention has been completed.

That is, the invention is identified by the following items [1] to [12].

[1] A lactic acid-based resin composition comprising a mixture of a mixture (A) of polylactic acid (a1) and an aliphatic polyester (a2), and an aliphatic block co-polyester (B) having a polylactic acid segment and an aliphatic polyester segment, wherein the aliphatic block co-polyester (B) satisfies all the following conditions (1) to (3):

(1) it contains a lactic acid component in an amount of from 20 to 80 wt % in terms of monomer, (2) it has a weight average molecular weight of 1,000 or more and less than 60,000, and (3) it has a weight average molecular weight of the polylactic acid segment of from 500 to 55,000 and a weight average molecular weight of the aliphatic polyester segment of from 500 to 55,000.

[2] A lactic acid-based resin composition described in item [1], wherein a compositional ratio of the mixture (A) and the aliphatic block co-polyester (B) is from 0.05 to 10 parts by weight of the aliphatic block co-polyester (B) per 100 parts by weight of the mixture (A).

[3] A lactic acid-based resin composition described in item [1] or [2], wherein the aliphatic polyester (a2) has an elastic modulus measured by the test method of JIS K6732 of 2,500 MPa or less.

[4] A lactic acid-based resin composition described in any one of items [1] to [3], wherein the mixture (A) of the polylactic acid (a1) and the aliphatic polyester (a2) has a mixing ratio of from 80 to 20 parts by weight of the aliphatic polyester (a2) per from 20 to 80 parts by weight of the polylactic acid (a 1).

[5] A lactic acid-based resin composition described in any one of items [1] to [4], wherein the aliphatic polyester (a2) is polybutylene succinate and/or polycaprolactone.

[6] A molded article comprising a lactic acid-based resin composition described in any one items [1] to [5].

[7] A molded article described in item [6], which is stretched in at least one direction by from 1.1 to 15 times.

[8] A molded article described in item [6] or [7], wherein the molded article is a film or a sheet.

[9] A molded article described in item [6] or [7], wherein the molded article is a tape yarn.

[10] A molded article described in item [6] or [7], wherein the molded article is a mono-filament or multi-filaments.

[11] A molded article described in item [6] or [7], wherein the molded article is a nonwoven fabric.

[12] A process of using an aliphatic block co-polyester (B) having a polylactic acid segment and an aliphatic polyester segment, as a compatibility agent for a mixture (A) of polylactic acid (a1) and an aliphatic polyester (a2), wherein the aliphatic block co-polyester (B) satisfies all the following conditions (1) to (3):

(1) it contains a lactic acid component in an amount of from 20 to 80 wt % in terms of monomer, (2) it has a weight average molecular weight of 1,000 or more and less than 60,000, and (3) it has a weight average molecular weight of the polylactic acid segment of from 500 to 55,000 and a weight average molecular weight of the aliphatic polyester segment of from 500 to 55,000.

BEST EMBODIMENT FOR CARRYING OUT THE INVENTION

The invention will be described in detail below.

In the invention, the mixture (A) of (a1) polylactic acid and (a2) an aliphatic polyester contains from 20 to 80 parts by weight of the polylactic acid (a1) and from 80 to 20 parts by weight of the aliphatic polyester (a2).

Polylactic Acid (a1)

As lactic acid used as a raw material of the polylactic acid, L-lactic acid, D-lactic acid, DL-lactic acid, a mixture thereof, and lactide, which is a cyclic dimer of lactic acid, can be exemplified.

As specific examples of a production process of the polylactic acid used in the invention, for example, 1) a method using lactic acid as a raw material, which is directly subjected to dehydration polycondensation (for example, the production method shown in U.S. Pat. No. 5,310,865), 2) a ring opening polymerization method, in which a cyclic dimer of lactic acid (lactide) is subjected to melt polymerization (for example, the production method disclosed in U.S. Pat. No. 2,758,987), 3) a method, in which upon producing a polyester polymer by carrying out a dehydration polycondensation reaction of lactic acid in the presence of a catalyst, solid phase polymerization is carried out in at least part of the process, and the like can be exemplified, but it is not particularly limited in the production process thereof. A small amount of an aliphatic polyhydric alcohol, such as trimethylolpropane, glycerin and the like, an aliphatic polybasic acid, such as butanetetracarboxylic acid and the like, and a polyhydric alcohol, such as a polysaccharide, may be copolymerized by coexisting, and the molecular weight may be increased by using a binder (a polymer chain extending agent), such as a diisocyanate compound and the like.

Aliphatic Polyester (a2)

The soft aliphatic polyester (a2) used in the invention is a polymer having biodegradability that can be produced by variously combining the aliphatic hydroxycarboxylic acid, the aliphatic dihydric alcohol and the aliphatic dibasic acid described later, and preferably has an elastic modulus measured by the test method of JIS K6732 of 2,500 MPa or less, more preferably from 1 to 1,500 MPa, further preferably from 5 to 1,000 MPa, still further preferably from 5 to 750 MPa, and most preferably from 5 to 500 MPa. When the elastic modulus is larger than 2,500 MPa, the softening effect upon mixing with the polylactic acid is small.

As a preferred soft aliphatic polyester shown in the invention, for example, polyethylene succinate, polybutylene succinate, polybutylene succinate adipate, polyhydroxybutyric acid, polyhydroxyvaleric acid, a copolymer of β-hydroxybutyric acid and β-hydroxyvaleric acid, polycaprolactone and the like can be exemplified. In particular, polybutylene succinate, polybutylene succinate adipate and polycaprolactone are preferred from the standpoint of the elastic modulus and the easy availability with low cost.

The aliphatic polyester may be those having a polymer chain extended with a binder, such as a diisocyanate and the like, may be those copolymerized in the presence of a small amount of an aliphatic polyhydric alcohol, such as trimethylolpropane, glycerin and the like, an aliphatic polybasic acid, such as butanetetracarboxylic acid, or a polyhydric alcohol, such as polysaccharide, and further may be those crosslinked with an electron beam.

As a production method of the aliphatic polyester, the similar method as the production method of the polylactic acid may be used, and the method is not limited.

Aliphatic Hydroxycarboxylic Acid

As specific examples of the aliphatic hydroxycarboxylic acid used in the soft aliphatic polyester in the invention, glycolic acid, lactic acid, 3-hydroxybutyric acid, 4-hydroxybutyric acid, 3-hydroxyvaleric acid, 4-hydroxyvaleric acid, 6-hydroxycaproic acid and the like can be exemplified, and furthermore, acyclic ester of the aliphatic hydroxycarboxylic acid, such as glycolide, which is a dimer of glycolic acid, and ε-caprolactone, which is a cyclic ester of 6-hydroxycaproic acid, can be exemplified. These may be used solely or in combination of two or more of them.

Specific examples of the aliphatic dihydric alcohol used in the aliphatic polyester in the invention, for example, ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanedimethanol and the like can be exemplified. These may be used solely or in combination of two or more of them.

Aliphatic Dibasic Acid

Specific examples of the aliphatic dibasic acid used in the soft aliphatic polyester in the invention, oxalic acid, glutaric acid, adipic acid, pimelic acid, suberic acid, azelaic acid, sebacic acid, undecane diacid, dodecane diacid, phenylsuccinic acid and the like can be exemplified. These may be used solely or in combination of two or more of them.

Molecular Weight of Polylactic Acid (a1) and Aliphatic Polyester (a2)

The weight average molecular weights (Mw) and the molecular weight distributions of the polylactic acid (a1) and the aliphatic polyester (a2) are not particularly limited as far as molding fabrication can be substantially possible. The weight average molecular weights of the polylactic acid (a1) and the aliphatic polyester (a2) used in the invention are not particularly limited as far as they exhibit substantially sufficient mechanical properties, and in general, it is preferably, in terms of weight average molecular weight (Mw), from 60,000 to 1,000,000, more preferably from 80,000 to 500,000, and most preferably from 100,000 to 300,000. In general, when the weight average molecular weight (Mw) is less than 60,000, a molded article obtained by molding fabrication of the resin composition has insufficient mechanical properties, and when the molecular weight exceeds 1,000,000, there are some cases where the melt viscosity upon molding fabrication becomes extremely high to make handling difficult, and the production becomes uneconomical.

Aliphatic Block Co-polyester (B)

The aliphatic block co-polyester (B) used in the invention is a block copolymer formed with lactic acid with the aliphatic dibasic acid, the aliphatic dihydric alcohol and the aliphatic hydroxycarboxylic acid, and is a block copolymer containing from 20 to 80 wt % of a lactic acid component in terms of monomer.

As the production process of the aliphatic block co-polyester (B) relating to the invention, it can be produced, for example, by applying the method of directly subjecting lactic acid to dehydration polycondensation and the method of ring opening polymerization of lactide, which is a dimer of lactic acid, which appear in the examples for polylactic acid described in the foregoing, and for example, 1) a method, in which a monomer is subjected to ring opening polymerization to form a polymer, and then other monomer component is added to the polymer by ring opening polymerization, where one of the monomers is lactide, and 2) a method, in which a polylactic acid component directly obtained by dehydration polycondensation or ring opening polymerization and an aliphatic polyester component obtained by the similar method are mixed and subjected to dehydration polycondensation addition in the presence or absence of a catalyst and/or an organic solvent can be exemplified.

More specifically, 1) a method as shown in Production Example 51, in which caprolactone is first subjected to ring opening polymerization in the presence of a catalyst and an aliphatic alcohol to obtain the polymer, and then polymerization is carried out with lactide charged (two-step ring opening polymerization), and 2) a method as shown in Production Example 510, in which polylactic acid, which is first directly obtained by dehydration polycondensation, and the other aliphatic polyester are mixed and subjected to dehydration polycondensation in the presence of a catalyst and an organic solvent (two-step dehydration polycondensation) can be exemplified.

In the invention, it is necessary that the molecular weight and the molecular weights of the respective block units of the aliphatic block co-polyester (B) are controlled to the particular ranges. As a method therefor, a method, in which the reaction conditions, such as the reaction temperature, the time and the like upon polymerization, are appropriately changed to follow up progress of the polymerization degree, and a method of adding an end termination agent can be exemplified, and particularly, in the case of the ring opening polymerization, the method of adding an end termination agent is particularly preferred owing to the large polymerization rate.

As the end termination agent that can be used in the invention, a compound having a hydroxyl group or a carboxyl group, for example, a compound having a monofunctional group, such as an aliphatic alcohol, an aliphatic carboxylic acid and an anhydride thereof, are preferred.

As the aliphatic alcohol, for example, a saturated or unsaturated, and linear or branched aliphatic alcohol having from 1 to 30 carbon atoms is exemplified, and methanol, ethanol, propanol, iso-propanol, butanol, iso-butanol, hexanol, octanol, lauryl alcohol, palmityl alcohol, myristyl alcohol, stearyl alcohol, oleyl alcohol and the like are exemplified.

As the aliphatic carboxylic acid and an anhydride thereof, for example, a saturated or unsaturated, and linear or branched aliphatic carboxylic acid having from 1 to 30 carbon atoms is exemplified, and acetic acid, propanoic acid, iso-propanoic acid, butanoic acid, iso-butanoic acid, tert-butanoic acid, heptanoic acid, iso-heptanoic acid, pentanoic acid, octanoic acid, lauric acid, palmitic acid, stearic acid, oleic acid, erucic acid, and behenic acid are exemplified. As the end termination agent used in the invention, ethanol, lauryl alcohol, palmityl alcohol, myrystyl alcohol, stearyl alcohol and oleyl alcohol are particularly preferably used.

The addition amount of the end termination agent is suitably from 0.05 to 5 mol % based on the total molar number of the monomer units constituting the aliphatic block co-polyester, preferably from 0.1 to 3 mol %, and more preferably from 0.2 to 2 mol %. When it is less than 0.05 mol %, the molecular weight of the aliphatic block co-polyester becomes large, and as a result, there are some cases where the compatibility effect is not exerted. On the other hand, when it is more than 5 mol %, the molecular weight of the aliphatic block co-polyester becomes small, and there are some cases where not only the compatibility effect is not exerted when formed into the composition of the invention, but also the mechanical strength is lowered.

The molecular weight of the aliphatic block co-polyester (B) is particularly important, and is 1,000 or more and less than 60,000 in terms of weight average molecular weight, preferably from 1,000 to 50,000, more preferably from 3,000 to 40,000, and further preferably from 5,000 to 30,000. When it is less than 1,000, the effect as the compatibility agent disappears. When it is larger than 60,000, on the other hand, the effect of addition is not exerted.

The repeating unit of lactic acid, which is the essential component of the block copolymer, suitably has a weight average molecular weight of from 500 to 55,000, preferably from 1,500 to 50,000, more preferably from 3,000 to 40,000, and further preferably from 5,000 to 30,000.

The other repeating unit of the aliphatic polyester suitably has a weight average molecular weight of from 500 to 55,000, preferably from 1,500 to 50,000, more preferably from 3,000 to 40,000, and further preferably from 5,000 to 30,000.

Addition Amount of Aliphatic Block Co-polyester (B)

The addition amount of the aliphatic block co-polyester (B) is from 0.05 to 10 parts by weight per 100 parts by weight of the mixture (A) of the polylactic acid (a1) and the other aliphatic polyester (a2). It is preferably from 0.1 to 7 parts by weight, more preferably from 0.2 to 5 parts by weight, and further preferably from 0.3 to 3 parts by weight.

When the addition amount of the aliphatic block co-polyester (B) is less than 0.05 part by weight, there are some cases where the compatibility effect is insufficient. When it exceeds 10 parts by weight, there are some cases where the heat resistance of the lactic acid-based resin composition is lowered, and the strength of the resulting molded article is decreased because the melting point and the molecular weight of the aliphatic block co-polyester (B) are relatively small.

The aliphatic block co-polyester (B) of the invention exhibits an excellent compatibility effect when the polylactic acid (a1) and the aliphatic polyester (a2) are mixed. For example, when pellets obtained by simply melting and kneading a mixture of polylactic acid and polybutylene succinate are melted by heat and then cooled, an exothermic peak due to crystallization of the polybutylene succinate component is observed on thermal analysis with DSC, and by adding the aliphatic block co-polyester (B) of the invention to the mixture, the exothermic peak disappears. In other words, it is considered that the addition of the aliphatic block co-polyester (B) of the invention suppresses separation and rearrangement of the polybutylene succinate component in the mixture upon melting and cooling to delay crystallization of the polybutylene succinate component, whereby the excellent compatibility effect is obtained. As a result, in a molded article formed by injection molding or the like, since the polybutylene succinate component is effectively dispersed in the mixture, the resulting molded article can exert a high elongation rate even when a relatively small amount of the aliphatic block co-polyester (B) is added. In a molded article having been stretched and oriented, such as a yarn, a filament, a nonwoven fabric and the like, concentration unevenness of the respective component and thickness unevenness in a molded article before stretching are decreased by adding the aliphatic block co-polyester (B), and thus further uniform and high stretching becomes possible to obtain a molded article having high strength.

Other Additives

In the lactic acid-based resin composition of the invention, various kinds of additives (a plasticizer, an antioxidant, an ultraviolet ray absorbent, a heat stabilizer, a flame-retardant, an internal releasing agent, an inorganic additive, an antistatic agent, a surface wettability improving agent, a combustion assistant, a pigment, a lubricant and a natural matter) and the like may be added corresponding to the objects (for example, improvement in moldability, secondary workability, degradability, tensile strength, heat resistance, storage stability, weather resistance and the like).

For example, in inflation molding and T-die extrusion molding, an inorganic additive and a lubricant (an aliphatic carboxylicamide, an aliphatic carboxylic bisamide and the like) may be added for blocking prevention and improvement of sliding property of a film and a sheet.

As the inorganic additive, silica, calcium carbonate, talc, kaolin, kaolinite, carbon, titanium oxide, zinc oxide and the like are exemplified, and in particular, silica and calcium carbonate are preferred. These may be used solely or as a mixture of two or more of them.

As the organic additive, starch and a derivative thereof, cellulose and a derivative thereof, pulp and a derivative thereof, paper and a derivative thereof, flour, bean curd refuse, palm chaff, coffee sullage, protein and the like are exemplified. These may be used solely or as a mixture of two or more of them.

Production Process of Lactic Acid-Based Resin Composition

The lactic acid-based resin composition of the invention is obtained by mixing and kneading the polylactic acid (a1) with the other aliphatic polyester (a2) and the aliphatic block co-polyester (B), as well as, depending on necessity, other additives. While the method for mixing and kneading is not particularly limited, a method, in which after uniformly mixing by using a high-speed mixer or a low-speed mixer, melt kneading is carried out with a mono-axial or multi-axial extruder having sufficient kneading performance, and a method of mixing and kneading upon melting can be employed.

In general, the shape of the lactic acid-based resin composition relating to the invention is preferably pellets, bars, powder and the like.

Molded Article and Production Process Thereof

The lactic acid-based resin composition of the invention is a preferred material that can be applied to the known molding methods, and as the resulting molded article, while not limited, for example, a film, a sheet, a mono-filament, multi-filaments, such as fibers, a nonwoven fabric and the like, an injection-molded article, a blow-molded article, a laminated article, a foamed article, a heat-molded article, such as vacuum-molded article and the like.

The lactic acid-based resin composition of the invention is good in molding property upon orientation and crystallization by stretching, and because the effect of the invention is markedly exhibited thereupon, it is preferred for the production of a film, a sheet, a tape yarn, a stretched blow-molded product, mono- and multi-filaments and a nonwoven fabric that are obtained by stretching.

As a molding method of the molded article obtained from the lactic acid-based resin composition of the invention, an injection molding method, a blow molding method (injection stretching blow, extrusion stretching blow and direct blow), a balloon method, an inflation method, a co-extrusion method, a calender method, a hot press method, a solvent casting method, a (stretching) extrusion method, an extrusion lamination method with paper or aluminum, contour extrusion molding, thermoforming such as vacuum (pressure) forming, melt spinning (a mono-filament, multi-filaments, a spun-bonding method, a melt-blown method, a fibrillated film yarn method and the like), a foaming molding method, a compression molding method and the like can be exemplified, and it can be applied to any method.

In particular, in the case of a molding method, such as extrusion molding, melt spinning and the like, containing steps of orientation and crystallization, the practical strength and the appearance, such as strength, heat resistance, impact resistance, transparency and the like, of the resulting molded article can be improved, and thus is can be more preferably used.

The molded article obtained by the lactic acid-based resin composition of the invention encompasses molded articles obtained by the known molding methods, and the shape, the size, the thickness, the design and the like thereof are not limited.

Specific Examples of Purpose

The molded article obtained by molding the lactic acid-based resin composition of the invention by using the foregoing molding methods can be preferably used as materials for wide ranges including various kinds of wrapping films for foods, electronics, medical use, pharmaceuticals, cosmetics and the like, and materials used in the fields of agriculture, civil engineering and fishery, for example, a bottle, a film or a sheet, a hollow tube, a laminated article, a vacuum (pneumatic) molded article, mono- or multifilaments, a nonwoven fabric, a foamed article, a shopping bag, a paper bag, a shrink film, a disposal bag, a compost bag, a lunch box, a bag for prepared foods, a packaging film for foods and confections, a wrapping film for foods, a wrapping film for cosmetics and perfumes, a diaper, a sanitary napkin, a wrapping film for pharmaceuticals, a wrapping film for a surgical patch drug applied to stiff neck, sprain and the like, a film for agriculture and horticulture, a wrapping film for agricultural chemicals, a film for green houses, a bag for manure, a packaging band, a packaging film for a magnetic tape cassette, such as those for video, audio and the like, a wrapping form for floppy disks, a film for prepress, an adhesive tape, a tape, a yarn, a pot for raising of seedling, a waterproof sheet, a soil bag, a building film, a weed-control sheet, a vegetation net and the like.

EXAMPLES

The invention will be specifically described with reference to the examples below, but it is not limited thereto unless it exceeds the technical range of the invention.

The weight average molecular weight (Mw), the physical properties and the like shown in Production Examples, Examples and Comparative Examples were measured in the manners shown below.

1) Weight Average Molecular Weight (Mw)

It was measured by gel permeation chromatography (GPC) by the polystyrene standard at a column temperature of 40° C. with chloroform as a solvent.

2) Strength, Elastic Modulus (Flexibility) and Elongation Rate of Film

They were obtained according to JIS K6732. The flexible film defined in the invention has an elastic modulus in a range of 2,500 MPa.

3) Tensile Strength, Elongation Rate, Flexural Strength and Flexural Elastic Modulus of Dumbbell Piece A test piece obtained by injection molding was evaluated according to ASTM D-790.

4) Strength and Elongation Rate of Filament

They were obtained according to JIS L1095.

5) Folding Endurance

It was obtained according to JIS P8115.

6) Haze

It has measured according to JIS K-6714 by using Haze Meter produced by Tokyo Denshoku Co., Ltd.

7) Dropping Impact Test 800 ml of water was charged in a 1,000 ml-container, which was dropped on a concrete floor from a height of 1.5 m under the condition of an atmospheric temperature of 20° C., so as to obtain the number of times until the container was broken. The number of times of dropping was repeated until ten times.

Production Example 1

Production of Polylactic Acid 400 kg of L-lactide, 0.04 kg of stannous octanoate and 0.12 kg of lauryl alcohol were charged in a cylindrical stainless steel-made polymerization container with large thickness having an agitator, and deaerated for 2 hours. After substituting with a nitrogen gas, they were heated and agitated at 200° C. and 10 mmHg for 2 hours.

After completing the reaction, a molten matter of polylactic acid was taken out from an outlet at an lower part, and then it was cooled and cut by a pelletizer. The resulting polylactic acid exhibited an yield amount of 340 kg, an yield of 85% and a weight average molecular weight (Mw) of 138,000.

Production Example 2

Production of Polylactic Acid 100 kg of 90% L-lactic acid and 450 g of tin powder were charged in a reactor having a Dien-Stark trap, and water was distilled off at 150° C. and 50 mmHg for 3 hours under agitation, followed by further agitating for 2 hours at 150° C. and 30 mmHg, so as to form an oligomer. 210 kg of diphenyl ether was added to the oligomer, and an azeotropic dehydration reaction was carried out at 150° C. and 35 mmHg. Water and the solvent thus distilled off were separated by a water separator, and only the solvent was returned to the reactor. After lapsing 2 hours, the organic solvent to be returned to the reactor was returned to the reactor after passing through a column filled with 46 kg of molecular sieve 3A, and the reaction was carried out at 130° C. and 17 mmHg for 20 hours, so as to obtain a polylactic acid solution having a weight average molecular weight (Mw) of 150,000. After diluting the solution by adding 440 kg of dehydrated diphenyl ether thereto, it was cooled to 40° C., and crystals thus deposited were filtered off. 120 kg of 0.5 N HCl and 120 kg of ethanol were added to the crystals, which was then agitated at 35° C. for 1 hour, followed by filtering and drying at 60° C. and 50 mmHg, so as to obtain 61 kg of polylactic acid powder (yield: 85%).

The powder was pelletized by melting in an extruder to obtain pellets of polylactic acid. The polymer had a weight average molecular weight (Mw) of 147,000.

Production Example 3

Production of Polybutylene Succinate 293.0 kg of diphenyl ether and 2.02 kg of metallic tin were added to 50.5 kg of 1,4-butanediol and 66.5 kg of succinic acid, and heated and agitated at 130° C. and 140 mmHg for 7 hours with distilling off water to form an oligomer. A Dean-Stark trap was attached thereto, and azeotropic dehydration was carried out at 140° C. and 30 mmHg for 8 hours. Thereafter, a tube filled with 40 kg of molecular sieve 3A was attached so that the distilled solvent was passed through the molecular sieve tube and was returned to the reactor, followed by agitating at 130° C. and 17 mmHg for 49 hours. The reaction mass was dissolved in 600 L of chloroform and was added to 4 kL of acetone to effect reprecipitation, and then sludging was carried out with an isopropyl alcohol (hereinafter abbreviated as IPA) solution of HCl (HCl concentration: 0.7 wt %) for 0.5 hour, followed by filtering. After washing the resulting cake with IPA, it was dried under reduced pressure at 60° C. for 6 hours, so as to obtain polybutylene succinate (hereinafter abbreviated as PSB). The polymer had a molecular weight of 140,000 and exhibited an yield of 92%.

Production Example 4
Production of Polyhydroxycaproic Acid

A reaction was carried out in the same manner as in Production Example 2 except that 6-hydroxycaproic acid was used instead of lactic acid, and as a result, polyhydroxycaproic acid (weight average molecular weight (Mw): 150,000, yield: 90%) was obtained.

Production Example 5
Production of Aliphatic Block Co-Polyester (B)

Production Example 51
Production of Block Copolymer of Polycaprolactone and Polylactic Acid 80 g of caprolactone, 1.6 g of ethanol and 0.56 g of tin (II) laurate were charged in a 1-L autoclave, and after sufficiently replacing the interior of the reactor with nitrogen, they were heated to a temperature of from 90 to 100° C. for 8 hours to obtain polycaprolactone (PCL) having a weight average molecular weight (Mw) of 8,000.

After charging 101 g of lactide, 0.56 g of tin (II) laurate and 20 g of toluene in the autoclave, the interior of the reaction system was replaced with nitrogen, and was heated to a temperature of from 100 to 110° C. for further 8 hours. The reaction mass inside the reactor was progressively solidified to be a block form.

After completing the reaction and cooling, 400 ml of chloroform was added to the reaction mass for dissolution, and it was added dropwise to 4 L of agitated methanol to deposit a polymer, which was then filtered off, followed by washing with hexane and drying.

The resulting polymer was a block copolymer of polycaprolactone (PCL) and polylactic acid (PLA) having a weight average molecular weight of 23,000 and exhibited an yield of 92%. The differential scanning caloric analysis (DSC analysis) of the block copolymer demonstrated melting points ascribed to the PCL segments and the PLA segments.

Production Example 52
Production of Random Polymer of Caprolactone and Lactic Acid The same procedures were carried out as in Production Example 51 except that the raw materials were charged all together, and as a result, a random copolymer of caprolactone and lactic acid was obtained. The yield was 87%, and the weight average molecular weight was 25,000. Melting points ascribed to the PCL block and the PLA block were not observed in the DSC analysis of the polymer.

Production Example 53 to 58

The same procedures as in Production Example 51 were carried out except that the amounts of ethanol (EtOH) and lactide (LTD) were changed. The results are shown in Table 1.

Production Example 59
Production of Block Copolymer of Polybutylene Succinate and Polylactic Acid 293.0 g of diphenyl ether and 2.02 g of metallic tin were added to 50.5 g of 1,4-butanediol and 66.5 g of succinic acid, and heated and agitated at 130° C. and 140 mmHg for 7 hours with distilling off water to the outside of the system, so as to form an oligomer. The weight average molecular weight was 10,000.

50.0 g of polylactic acid (weight average molecular weight: 8,600) obtained in the same manner as in Production Example 2 and 0.7 g of metallic tin were mixed with the resulting reaction mass of polybutylene succinate, and again subjected to a dehydration polycondensation reaction at 130° C. and 17 mmHg for 8 hours. After completing the reaction, the same post treatments were carried out in the same manner as in Production Example 2 to obtain 89.7 g of a block copolymer of polybutylene succinate and polylactic acid. The block copolymer had a weight average molecular weight of 22,000.

Production Example 510
Production of Block Copolymer of Polyhydroxycaproic Acid and Polylactic Acid 100 g of 90% L-lactic acid and 450 mg of tin powder were charged in a reactor having a Dean-Stark trap, and water was distilled off at 150° C. and 35 mmHg for 3 hours under agitation, followed by further agitating for 2 hours at 150° C. and 30 mmHg, so as to form an oligomer. 210 g of diphenyl ether was added to the oligomer, and an azeotropic dehydration reaction was carried out at 150° C. and 35 mmHg. Water and the solvent thus distilled off were separated by a water separator, and only the solvent was returned to the reactor. Polylactic acid in the reaction mass had a weight average molecular weight of 7,500.

Separately, the formation of an oligomer and anazeotropic dehydration reaction were carried out in the same manner except that 100 g of 6-hydroxylcarboxylic was used instead of 90% L-lactic acid, and as a result, a reaction mass of polyhydroxycaproic acid having a weight average molecular weight of 12,000 was obtained.

150 g of the reaction mass of polylactic acid was charged in the reactor of 150 g of reaction mass of polyhydroxycaproic acid, and an azeotropic dehydration reaction was again carried out at 150° C. and 35 mmHg for 4 hours. A block copolymer of polylactic acid and polyhydroxycaproic acid in the reaction mass was obtained. The weight average molecular weight was 27,000.

After adding 440 g of dehydrated diphenyl ether to the solution for dilution, it was cooled to 40° C., and crystals thus deposited were filtered off. 120 g of 0.5 N-HCl and 120 g of ethanol were added to the crystals, which was then agitated at 35° C. for 1 hour, followed by filtering and drying at 60° C. and 50 mmHg, so as to obtain a block copolymer with polyhydroxycaproic acid.

Example 1-1

140 kg of the polylactic acid obtained in Production Example 1, 60 kg of the polybutylene succinate obtained in

TABLE 1

| Production Example No. | 5-3 | 5-4 | 5-5 | 5-6 | 5-7 | 5-8 |
|---|---|---|---|---|---|---|
| CL amount (g) | 80 | 80 | 80 | 80 | 80 | 80 |
| EtOH amount (g) | 1.6 | 0.8 | 1.2 | 0.4 | 1.6 | 0.2 |
| Mw of PCL | 6,000 | 18,000 | 14,000 | 31,000 | 8,000 | 74,000 |
| LTD amount (g) | 100 | 100 | 100 | 101 | 300 | 100 |
| Mw of block copolymer | 25,000 | 42,000 | 33,000 | 77,000 | 85,000 | 168,000 |

Production Example 3, and 1 kg of the block co-polyester of polylactic acid and polycaprolactone obtained in Production Example 5-1 were mixed in a Henschel mixer and then pelletized by a biaxial extruder under the conditions of a cylinder preset temperature of from 180 to 210° C. After drying the pellets at 80° C. for 10 hours, spinning molding was carried out at a temperature of from 200 to 220° C. by using a forming winder of 65 mm (dice diameter: 40 mm, number of nozzles: 90) to obtain a non-stretched thread, which is then subjected to stretching in a first water bath at a temperature of from 70 to 80° C. and a second water bath at from 90 to 100° C. (total stretching ratio: 7.2 times), followed by subjecting to a heat treatment through an atmosphere of from 100 to 120° C.

The spinning property was stable and good. The resulting thread had a thread thickness of 500 d, a strength of 4.78±0.15 g/d, and an elongation rate of 22±3%. The results are shown in Table 2.

Examples 1-2 to 1-6

The same procedures as in Example 1-1 were carried out except that instead of the block co-polyester of polylactic acid and polycaprolactone obtained in Production Example 5-1 used in Example 1-1, the block co-polyesters produced in the other production conditions were used. The spinning properties, the stretching ratios and the properties of the resulting threads are shown in Table 2.

TABLE 2

| Example No. | 1-1 | 1-2 | 1-3 | 1-4 | 1-5 | 1-6 |
|---|---|---|---|---|---|---|
| Lactic acid-based resin composition | | | | | | |
| Polylactic acid (a1) kind | Production Example 1 | Production Example 2 | Production Example 2 | Production Example 2 | Production Example 1 | Production Example 1 |
| amount (kg) | 140 | 120 | 140 | 120 | 140 | 140 |
| Aliphatic polyester (a2) kind | Production Example 3 | Production Example 3 | Production Example 4 | Production Example 4 | Production Example 3 | Production Example 4 |
| amount (kg) | 60 | 80 | 60 | 60 | 60 | 60 |
| Aliphatic block co-polyester (B) | | | | | | |
| kind | 5-1 | 5-3 | 5-4 | 5-5 | 5-9 | 5-10 |
| amount (kg) | 1.0 | 1.5 | 2.0 | 1.0 | 2.0 | 1.5 |
| Spinning property | good | good | good | good | good | good |
| Stretching condition Stretching ratio | 7.2 | 7.6 | 7.5 | 8.0 | 7.2 | 7.5 |
| Properties of thread | | | | | | |
| Thickness (d) | 500 | 500 | 500 | 500 | 500 | 500 |
| Strength (g/d) | 4.78 ± 0.15 | 4.11 ± 0.20 | 4.67 ± 0.18 | 4.01 ± 0.17 | 4.72 ± 0.19 | 4.82 ± 0.16 |
| Elongation rate (%) | 22 ± 3 | 28 ± 4 | 24 ± 2 | 30 ± 4 | 22 ± 3 | 25 ± 2 |

Comparative Example 1-1

The same procedures as in Example 1-1 were carried out except that the addition of the block co-polyester used in Example 1-1 was omitted. The spinning property was that thread breakage sometimes occurred, and stable spinning could not be carried out. The stretching ratio was 5.8 times. The resulting thread had a thread thickness of 500 d, a strength of 2.86±0.4 g/d, and an elongation rate of 25±6%. The results are shown in Table 3.

Comparative Examples 1-2 to 1-5

The same procedures as in Example 1-1 were carried out except that instead of the block co-polyester used in Example 1-1, the other block co-polyesters were used. The spinning properties, the stretching ratios and the properties of the resulting threads are shown in Table 3.

TABLE 3

| Comparative Example No. | 1-1 | 1-2 | 1-3 | 1-4 | 1-5 | 1-6 |
|---|---|---|---|---|---|---|
| Lactic acid-based resin composition | | | | | | |
| Polylactic acid (a1) kind | Production Example 1 | Production Example 2 | Production Example 2 | Production Example 2 | Production Example 2 | Production Example 2 |
| amount (kg) | 140 | 140 | 140 | 120 | 140 | 140 |
| Aliphatic polyester (a2) kind | Production Example 3 | Production Example 3 | Production Example 4 | Production Example 4 | Production Example 4 | Production Example 3 |
| amount (kg) | 60 | 60 | 60 | 60 | 60 | 60 |

TABLE 3-continued

| Comparative Example No. | 1-1 | 1-2 | 1-3 | 1-4 | 1-5 | 1-6 |
|---|---|---|---|---|---|---|
| Aliphatic block co-polyester | | | | | | |
| kind | — | 5-2 | — | 5-6 | 5-7 | 5-8 |
| amount (kg) | — | 1.0 | — | 2.0 | 2.0 | 1.0 |
| Spinning property | poor | poor | poor | poor | poor | poor |
| Stretching condition | | | | | | |
| Stretching ratio | 5.8 | 6.2 | 6.1 | 6.5 | 6.3 | 6.4 |
| Properties of thread | | | | | | |
| Thickness (d) | 500 | 500 | 500 | 500 | 500 | 500 |
| Strength (g/d) | 2.86 ± 0.4 | 2.43 ± 0.51 | 2.75 ± 0.42 | 2.41 ± 0.45 | 2.85 ± 0.50 | 2.90 ± 0.43 |
| Elongation rate (%) | 25 ± 6 | 33 ± 6 | 24 ± 6 | 32 ± 6 | 22 ± 3 | 22 ± 3 |

Example 2

Injection Molding 0.5 part by weight of the block co-polyester obtained in Production Example 5-10 was mixed with 60 parts by weight of the polylactic acid obtained in Production Example 1 and 40 parts by weight of Celgreen PH7 (a trade name, produced by Daicel Chemical Industries, Ltd.) as polycaprolactofle, and it was pelletized at 190° C. by using a biaxial extruder. The resulting pellets were dried at 80° C. for 8 hours. The pellets were subjected to injection molding in a metallic mold set at from 10 to 30° C. by using an injection molding machine having a dehumidifying dryer at a cylinder temperature of from 140 to 220° C. and a die temperature of from 170 to 190° C., so as to obtain a molded article of a dumbbell piece for tension and flexure. The resulting dumbbell piece had a flexural strength of 65 MPa, a flexural elastic modulus of 2,200 MPa, a tensile strength of 55 MPa and an elongation rate of 220%.

Comparative Example 2

Injection Molding

The same procedures as in Example 2 were carried out except that the block co-polyester was not used, and as a result, the resulting dumbbell piece had a flexural strength of 67 MPa, a flexural elastic modulus of 2,300 MPa, a tensile strength of 57 MPa and an elongation rate of 25%.

Example 3

Spinning Molding (Production of Multifilaments)

0.5 part by weight of the block co-polyester obtained in Production Example 5-1 was mixed with 70 parts by weight of the polylactic acid obtained in Production Example 2 and 40 parts by weight of Bionolle 1001 (a trade name, produced by Showa Highpolymer Co., Ltd.) as polybutylene succinate, and it was pelletized at 190° C. by using a biaxial extruder. The resulting pellets were dried at 80° C. for 8 hours.

The pellets were spun by using a dry spinning machine having a dehumidifying dryer with a die having a pore diameter of 0.2 mm and a number of pores of 20 at a temperature of 230° C. to obtain a semi-stretched thread. The molding property upon molding was that spinning could be carried out in good conditions without thread breakage.

The resulting thread was stretched at a temperature of from 80 to 100° C. and subjected to thermal fixing at a temperature of from 120 to 140° C.

The resulting fibers had a thread diameter of 5 d and a strength of 4.85±0.17 g/d.

Comparative Example 3

Spinning Molding (Production of Multifilaments)

The same procedures as in Example 3 were carried out except that the block co-polyester was not used to obtain pellets, and spinning was carried out at a die temperature of 230° C.

The molding property upon molding was that thread breakage sometimes occurred, and good spinning and stretching could not be carried out.

The resulting fibers had a thread diameter of 5 d and a strength of 3.00±0.41 g/d.

Example 4

Paper Lamination Molding 1.0 part by weight of the block co-polyester obtained in Example 5-1 was mixed with 60 parts by weight of the polylactic acid obtained in Production Example 2 and 40 parts by weight of the polybutylene succinate obtained in Production Example 3, and it was pelletized at 190° C. by using a biaxial extruder. The resulting pellets were dried at 90° C. for 8 hours.

The pellets were subjected to kneading and melting and were extruded on kraft paper (basis weight: 75 g/m$^2$) at a winding speed of 120 m/min by using an extruder having a dehumidifying dryer with a T-die having a width of 1,300 mm and a lip width of 0.8 mm at 235° C.

The film forming property at this time was good with no film breakage.

The resulting paper laminated product had a thickness of the resin layer of 20±2 μm, and the thickness accuracy was good.

Comparative Example 4

Paper Lamination Molding

Pellets were obtained in the same manner as in Example 4 except that the block co-polyester was not used, and were extruded at a die. temperature of 235° C. The film forming property at this time was that film breakage sometimes occurred, and stable molding could not be carried out. The resulting paper laminated product had a thickness of the resin layer of 23±7 μm, and the thickness accuracy was not very good.

Example 5

Stretching Blow Molding 1.0 part by weight of the block co-polyester obtained in Production Example 51 was mixed with 60 parts by weight of the polylactic acid obtained in Production Example 2 and 40 parts by weight of the polybutylene succinate obtained in Production Example 3, and it was pelletized at 190° C. by using a biaxial extruder, followed by drying at 90° C. for 8 hours. By using the pellets, they were melted in an injection stretching blow molding machine at a cylinder temperature of from 140 to 250° C. to effect injection molding in a metallic mold set at from 0 to 50° C., so as to obtain a cold parison in a weight of 40 g. After heating and softening the resulting parison at 100° C., it was moved to the interior of a metallic mold having a bottle shape, into which pressurized air at 1 MPa was blown to effect blow stretching at 3.5 times in the vertical direction and 3 times in the horizontal direction, whereby a cylindrical bottle having a bore diameter of 75 mm, a height of 100 mm and an internal volume of 1,000 ml was obtained. The thickness of the wall was 0.2 mm, and the haze was 2.6%.

800 ml of water was charged in the blown container, which was repeatedly dropped on a concrete floor from a height of 1.5 m 10 times under the condition of an atmospheric temperature of 20° C., but it was not broken.

Comparative Example 5
Stretching Blow Molding

The same procedures as in Example 5 were carried out to produce a bottle having an internal volume of 1,000 ml except that the block co-polyester was not used, and as a result, a cylindrical bottle having a bore diameter of 75 mm, a height of 100 mm and an internal volume of 1,000 ml was obtained. The thickness of the wall was 0.2 mm, and the haze was 20%.

800 ml of water was charged in the blown container, which was repeatedly dropped on a concrete floor from a height of 1.5 m under the condition of an atmospheric temperature of 20° C., and it was broken at the third drop.

Example 6
Extrusion Stretching Molding 0.5 part by weight of the block co-polyester obtained in Production Example 5-1 was mixed with 60 parts by weight of the polylactic acid obtained in Production Example 1 and 40 parts by weight of the polybutylene succinate obtained in Production Example 3, and it was pelletized at 190° C. by using a biaxial extruder. The resulting pellets were dried at 80° C. for 8 hours. By using the resulting pellets, they were formed into a film having a thickness of 200 μm by using an extruder having a dehumidifying dryer. The film was stretched 2.5 times in the vertical direction and 2.5 times in the horizontal direction in an oven set at a temperature of from 65 to 75° C.

The resulting film had a thickness of 30 μm, a tensile strength of 45 MPa, a tensile elastic modulus of 1,200 MPa, an elongation rate of 300%, a haze of 2.3%, and a folding endurance of 5,000 times or more.

Comparative Example 6
Extrusion Stretching Molding

The same procedures as in Example 6 were carried out except that the block co-polyester was not used, and as a result, a film having a thickness of 200 μm was obtained. The film was stretched 2.5 times in the vertical direction and 2.5 times in the horizontal direction in an oven set at a temperature of from 65 to 75° C.

The resulting film had a thickness of 30 μm, a tensile strength of 43 MPa, a tensile elastic modulus of 1,300 MPa, an elongation rate of from 20 to 280%, a haze of 6.1%, and a folding endurance of from 1,500 to 5,000 times.

Example 7
Tape Yarn Molding 0.5 part by weight of the block co-polyester obtained in Production Example 51 was mixed with 70 parts by weight of the polylactic acid obtained in Production Example 1 and 30 parts by weight of the polybutylene succinate obtained in Production Example 3, and it was pelletized at 190° C. by using a biaxial extruder. The resulting pellets were dried at 80° C. for 8 hours. By using the resulting pellets, they were formed into a film by using a 90 mm-extruder having a dehumidifying dryer with a die width of 1,200 mm and a lip gap of 0.8 mm at a temperature of from 150 to 210° C., so as to obtain a film having a thickness of 100 μm. The film was slit into a width of 6 mm and stretched 5 times by heat plate stretching at a temperature of from 65 to 80° C., followed by thermal fixing on a heat plate at from 100 to 120° C. The resulting tape had a width of 3.5 mm, a thickness of 30 μm and a strength of 5.10±0.13 g/d.

Comparative Example 7
Tape Yarn Molding

The same procedures as in Example 7 were carried out except that the block co-polyester was not used, and as a result, a tape having a width of 3.6 mm and a thickness of 35 μm was obtained. The resulting tape had a strength of 2.89±0.47 g/d.

Example 8
Nonwoven Fabric Molding 0.5 part by weight of the block co-polyester obtained in Production Example 5-1 was mixed with 70 parts by weight of the polylactic acid obtained in Production Example 2 and 30 parts by weight of the polybutylene succinate obtained in Production Example 3, and it was pelletized at 190° C. by using a biaxial extruder. The resulting pellets were dried at 80° C. for 8 hours. The pellets were melted at 210° C. and subjected to melt spinning through a spinning die having spinning pores of a pore diameter of 0.35 mm, and they were picked up by an air sucker arranged under the surface of spinning die by 1,300 mm and were accumulated on a moving collecting surface to form a web. The pickup speed at this time was about 3,500 m/min.

The resulting web was passed between a metallic embossed roll heated to a temperature of from 80 to 100° C. and a smooth metallic roll heated to the same temperature as the metallic embossed roll to effect heat fusion, whereby a nonwoven fabric was obtained.

The short fiber strength of the resulting nonwoven fabric was 2.5 d, and the basis weight of the nonwoven fabric was 30 g/m$^2$. The nonwoven fabric was treated in an oven at 90° C. for 60 seconds, and the shrinking degree obtained from the dimensions before and after the treatment was 5.8%.

Comparative Example 8

Pellets were obtained in the same manner as in Example 8 except that the block co-polyester was omitted, and they were subjected to melt spinning at 210° C.

The spinning property upon molding was that thread breakage sometimes occurred, and good spinning could not be carried out under the conditions of a pickup speed of about 3,500 m/min.

When the pickup speed was then decreased to about 2,600 m/min, spinning could be carried out without thread breakage to obtain a nonwoven fabric having a short fiber strength of 3.0 d and a basis weight of 30 g/m$^2$, but the shrinking degree after treating in an oven at 90° C. for 60 seconds was as large as 17%.

Industrial Availableness

The lactic acid-based resin composition relating to the invention has transparency and flexibility because the respective compositional resins are effectively dispersed.

The molded article formed therefrom is good in molding property, and in particular, a molded article thus stretched, oriented and crystallized, such as a film, a sheet, a filament and the like, is a molded article that has excellent mechanical property and heat resistance in addition to the foregoing properties. Therefore, it can be preferably used as materials of wide ranges, such as various kinds of packaging materials for food, electronics, medical use, pharmaceuticals, cosmetics and the like, materials for agriculture, civil engineering and construction, and fishery, a compost material, and the like. When it is discarded after use, it is not accumulated as industrial waste and domestic waste.

What is claimed is:

1. A lactic acid-based resin composition comprising a mixture of a mixture (A) of polylactic acid (a1) and an aliphatic polyester (a2), and an aliphatic block co-polyester (B) having a polylactic acid segment and an aliphatic polyester segment, wherein the aliphatic block co-polyester (B) satisfies all the following conditions (1) to (3):

(1) it contains a lactic acid component in an amount of from 20 to 80 wt % in terms of monomer, (2) it has a weight average molecular weight of 1,000 or more and less than 60,000, and (3) it has a weight average molecular weight of the polylactic acid segment of from 500 to 55,000 and a weight average molecular weight of the aliphatic polyester segment of from 500 to 55,000.

2. The lactic acid-based resin composition according to claim 1, wherein a compositional ratio of the mixture (A) and the aliphatic block co-polyester (B) is from 0.05 to 10 parts by weight of the aliphatic block co-polyester (B) per 100 parts by weight of the mixture (A).

3. The lactic acid-based resin composition according to claim 1, wherein the aliphatic polyester (a2) has an elastic modulus measured by the test method of JIS K6732 of 2,500 MPa or less.

4. The lactic acid-based resin composition according to claim 1, wherein the mixture (A) of the polylactic acid (a1) and the aliphatic polyester (a2) has a mixing ratio of from 80 to 20 parts by weight of the aliphatic polyester (a2) per from 20 to 80 parts by weight of the polylactic acid (a1).

5. The lactic acid-based resin composition according to claim 1, wherein the aliphatic polyester (a2) is polybutylene succinate and/or polycaprolactone.

6. A molded article comprising a lactic acid-based resin composition according to claim 1.

7. The molded article according to claim 6, which is stretched in at least one direction by from 1.1 to 15 times.

8. The molded article according to claim 6, wherein the molded article is a film or a sheet.

9. The molded article according to claim 6, wherein the molded article is a tape yarn.

10. The molded article according to claim 6, wherein the molded article is a mono-filament or multi-filaments.

11. The molded article according to claim 6, wherein the molded article is a nonwoven fabric.

12. A process of using (B) an aliphatic block co-polyester having a polylactic acid segment and an aliphatic polyester segment, as a compatibility agent for a mixture (A) of polylactic acid (a1) and an aliphatic polyester (a2), wherein the aliphatic block co-polyester (B) satisfies all the following conditions (1) to (3):

(1) it contains a lactic acid component in an amount of from 20 to 80 wt % in terms of monomer, (2) it has a weight average molecular weight of 1,000 or more and less than 60,000, and (3) it has a weight average molecular weight of the polylactic acid segment of from 500 to 55,000 and a weight average molecular weight of the aliphatic polyester segment of from 500 to 55,000.

* * * * *